(12) United States Patent
Berthe et al.

(10) Patent No.: US 6,182,243 B1
(45) Date of Patent: Jan. 30, 2001

(54) SELECTIVE DATA CAPTURE FOR SOFTWARE EXCEPTION CONDITIONS

(75) Inventors: Jean Berthe, Nice; Herve Perrinot, Cagnes-sur-Mer, both of (FR)

(73) Assignee: International Business Machines Corporation, Armonk, NY (US)

( * ) Notice: Under 35 U.S.C. 154(b), the term of this patent shall be extended for 0 days.

(21) Appl. No.: 08/033,731

(22) Filed: Mar. 18, 1993

(30) Foreign Application Priority Data

Sep. 11, 1992 (EP) .................................................. 92480129

(51) Int. Cl.⁷ ....................................................... G06F 11/00
(52) U.S. Cl. ................................................... 714/38; 717/4
(58) Field of Search .............................. 395/575, 183.1, 395/183.14; 371/19, 29.1; 717/3, 4; 714/34, 35, 36, 37, 38

(56) References Cited

U.S. PATENT DOCUMENTS

| 4,670,835 | * | 6/1987 | Kelly et al. . |
| 5,119,377 | * | 6/1992 | Cobb et al. . |
| 5,128,885 | * | 7/1992 | Janis et al. . |
| 5,241,635 | * | 8/1993 | Papadopoulos . |

FOREIGN PATENT DOCUMENTS

| 0403415 | 12/1990 | (EP) | ................................ G06F/11/00 |
| 0444315 | 9/1991 | (EP) | ................................ G06F/11/00 |

OTHER PUBLICATIONS

IBM Technical Disclosure Bulletin, vol. 36, No. 1A, Jun. 1992, New York, "IBM Snapdump for OS/2", pp. 228–229.

IBM Technical Disclosure Bulletin, vol. 35, No. 7B, Dec. 1991, New York, "Tailorable Embedded Event Trace", pp. 259–261.

* cited by examiner

*Primary Examiner*—Robert W. Beausoliel, Jr.
*Assistant Examiner*—Pierre Eddy Elisca
(74) *Attorney, Agent, or Firm*—John J. Timar

(57) ABSTRACT

A selective data capture method for software exception conditions in the operation of a data processing system includes steps for describing the pertinent data to collect before loss of control of the faulty program occurs. First the program preventively declares in a table all the data to capture in case of error (501). In a second stage, at the key points of the code, the pertinent sets of data in the table are activated (502). On the occurrence of an error (503), only the data previously declared and activated are collected (504) by the external code in charge of managing the error reporting to a maintenance subsystem (505). The invention is attached to the global data capture strategy, particularly to the Error Notification and Selective Dump processes.

11 Claims, 7 Drawing Sheets

SELECTIVE DATA CAPTURE FOR SOFTWARE EXCEPTION CONDITIONS

TECHNICAL FIELD

The present invention relates to program debugging methods and more particularly to a selective method for capturing data in software exception conditions during the operation of a data processing system.

BACKGROUND ART

When a new computer software product is conceived, there is a typical cycle or process that takes place in the course of bringing the product to the market to ensure all the reliability and serviceability required by the customer. The programming cycle typically includes:

the conception of the idea
the design of the software to implement the idea
the coding of the program based on the design
the initial testing and debugging in the development environment
the testing at the user site
the final release of the software to the market
the maintenance
the update of the software with new releases Normally the release of a software product depends on meeting a development calendar. If defects or errors (known as bugs) appear in the code, the product deadlines will be missed. This is particularly likely if the bugs are complex, subtle or otherwise difficult to find. Such delays can cause a software product to fail in the marketplace. In the same way, the availability, the quality and the ease of maintenance of a software product are the key factors of a success in a competitive environment.

Historically, most software was designed under the assumption that it would never fail. Software had little or no error detection capability designed into it. When a software error or failure occurred, it was usually the computer operating system that detected the error and the computer operator cancelled the execution of the software program because the correct result was not achieved. To facilitate the development, test and maintenance of more and more important and complex programs, it has been necessary to define debugging methods and tools to detect, isolate, report and recover all software and hardware malfunctions.

Error handling and problem determination are based on the following principles:

all programs may fail or produce erroneous data
a program detecting an error may be itself in error
all detected errors or failures, permanent or transient, must be reported with all the data needed to understand what is going on. A transient error means a temporary failure which is recovered by the program itself but is however reported for information purpose.
all errors fall in one of the following categories:
Hardware error or failure
Functional error
Invalid input internal to the program
Invalid input external to the program
Time out
Exception conditions, such as:
divide error
invalid address
loop
invalid operation code
floating point error
. . .
Exception conditions are errors detected by the processor itself in the course of executing instructions. They can be classified as Faults, Traps, or Aborts depending to the usage of the different suppliers of data processors.

Upon a software error, the most commonly used method is to capture the entire storage area allocated to the program: this process is called Global or Physical Dump. However,
The error occurs before the program can detect it and the key data required to determine the cause of the error or failure are often lost or overlaid
the more complex the error is, the more data are generated
the dispersion of the information in the system storage increase the difficulty to isolate complex errors
the transfer of a large quantity of data is resource consuming in time and storage and can affect the customer performances.

As frequently happens, so much output is generated that any significant information is buried in a mass of unimportant details. Thus the programmer must always guess whether the benefits of preserving and retrieving all the data in the processor storage outweigh the disadvantages of an endless and laborious analysis. In another way, it is not always obvious to follow the path of execution to the point where the error finally appears and most program developers use a process called Trace to isolate a software error. According to this process, Trace points are placed within the failing program in order to sample data through the path of execution, the problem is recreated and data from the trace points are collected. Unfortunately, Traces have some bad side effects including the following:

Traces require a branch to a trace routine every time a trace point is encountered, often resulting in a significant impact to not only the problem program's performance, but to other programs executing on the same system
Traces requires large data sets to contain the volumes of data generated by Trace points
for the programmer that uses Traces to capture diagnostic data, he invariably finds himself sifting through large amounts of data, the majority of which does not reflect on the cause of the error
the problem must be reproduced. If the software problem was caused by a timing problem between two programs (e.g., two networking programs communicating with each other), the trace can slow the program execution down to the point where most timing problem cannot be recreated.

Solicited Dumps and Traces, as described previously, are triggered on request of an external intervening party: console, host, operator . . . . They are based on a methodology which waits for the damage caused by a software error to surface. In both cases large amounts of data are collected, hopefully catching the data that will determine what was wrong.

Immediate error detection and automatic diagnostic data collection can be achieved by means of error code placed directly within the program during development. When an error or failure occurs, it is detected by the program itself which calls a process to capture and report only the data required to debug the error: this process is usually called Error Notification. The description of the data such as layout and format are generally stored in a predefined table whose entries are selected by the error detection code of the program. Typical of this state of the art is the U.S. Pat. No. 5,119,377 disclosing a method and system for detecting and diagnosing errors in a computer program. The major advantages of this process are the following:

The reported information can be processed, visualized and interpreted in real time mode.

The data required to diagnose the error are captured the first time the error appears: the problem does not have to be recreated.

Error can be isolated and its propagation stopped before permanent damage can occur.

The data reported are limited to the error to be resolved which facilitates data report and the problem isolation and correction.

This process is only called conditionally when the error is detected and remains completely idle until such condition occurs. The impact on the computer resources and the programs performances remains minimum.

Selective Dumps, limited to the error context can be automatically triggered and retrieved on request of the program itself (Unsolicited Dump).

Permanent Traces can be included in the captured and reported data. These Traces, also called internal Traces, are an integral part of the code. They are cyclically updated according to the program progress and thereby allow a dynamic view of the suspected code.

The process can be extended to events to report data at some specific stages of the code progress or at particular occurrences.

The Error Notification process, previously described, implies that all pieces of code can detect and describe the errors in which they are involved with the actions to be done to recover the control or minimize the impact of the failing element. That means a systematic checking of all inputs (internal and external), the use of hardware checkers and the implementation of functional tests and timers in the key points of the code.

At this stage of analysis, it appears opportune to classify errors in two different types:

Minor Errors: the program detects itself the error or failure and the associated pertinent information are collected by means of a dedicated error code.

Major Errors: the program loses control of the operations and is no longer able to detect itself the error or failure. The error is detected by an external system (the operating system, control program, data processor . . . ) and the pertinent information are collected and reported independently of the faulty program. The exceptions conditions such as divide error, invalid operation code, loop, floating point error . . . belong to this category of major error.

Major Errors pose the problem of the selective data capture by an independent system: the faulty program is no longer able to describe the useful data to report and the Error Notification method previously detailed becomes, in this case, inoperative. By lack of specific guidelines, the external code is constrained to collect without discernment all the available data by the means of a global Dump or external Traces. In addition of the disadvantages inherent to the Dump or Trace usage, this situation forbids:
the problem investigation in real time
the automatic analysis of the data
the triggering of specific recovery actions

OBJECTS OF THE INVENTION

One object of the present invention is, when a Major Error occurs, to provide an efficient and very simple data selection method ensuring a high quality and integrity of the information collected with a minimum impact on the performance and the resources of the data processing system.

BRIEF SUMMARY OF THE INVENTION

The data capture includes means for describing the pertinent data to collect before loss of control of the faulty program occurs. In a preferred embodiment, the program preventively declares in a list all the data to capture in case of Major error. In a second stage, at the key points of the code, the pertinent sets of data in the list are activated. On the occurrence of an error, only the data previously declared and activated are collected by the external code in charge of the error reporting.

The invention is attached to the global data capture strategy and particularly to the Error Notification and Selective Dump processes.

The present invention contributes to an efficient and an high quality software development and maintenance.

DETAILED DESCRIPTION OF THE PREFERRED EMBODIMENT OF THE INVENTION

Figure 1:
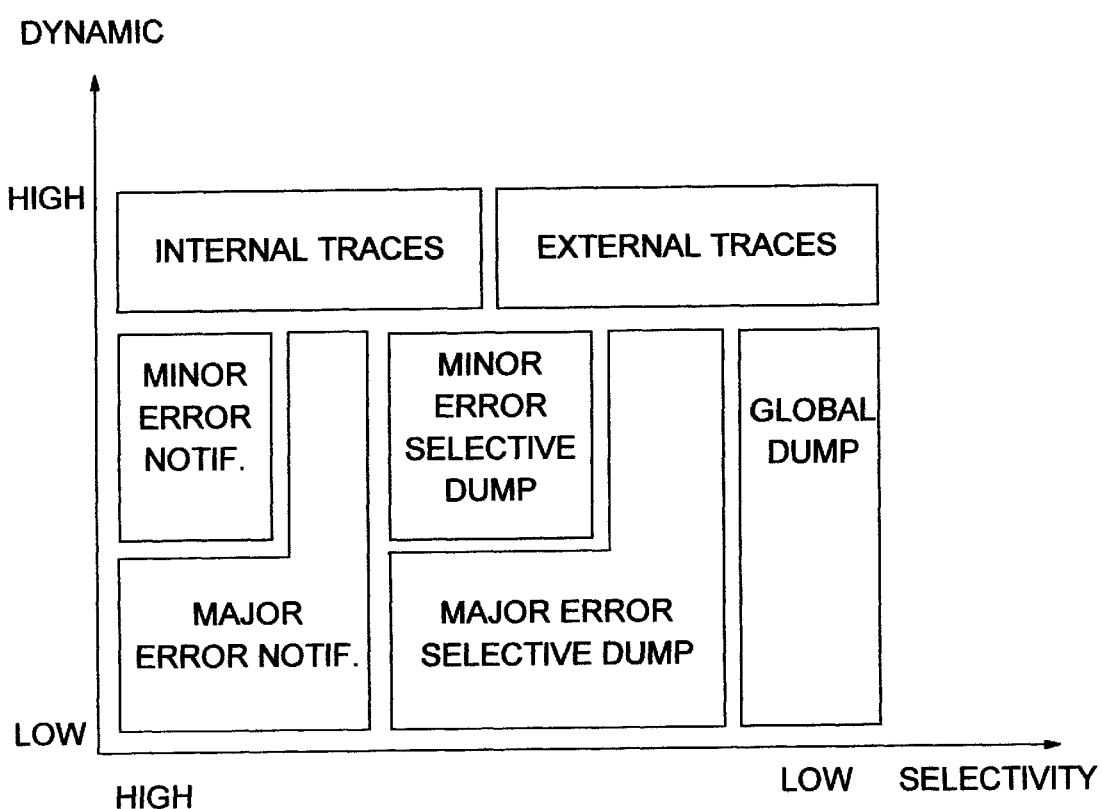
FIG. 1 illustrates the main characteristics of the different prior art debug tools commonly used and the situation of the present invention in the context of the global data capture strategy.

The general process of the error handling can be summarized by the following steps:
The error handling process in real time:
    error detection
    data capture
    error recovery
    restart of the process
The error handling process in deferred time:
    problem reproduction
    error isolation and investigation
    correction FIG. 1 illustrates the place of the present invention in the context of a global data capture strategy. This strategy has been conceived in function of constraints which can be described in term of:
Resource consumption:
    storage occupation
    processor time
    data throughput
Customer performances
Data availability and access:
    in real time
    in deferred time Quality and integrity of the information
Reproduction capability of the problem The capacity of the different methods to satisfy theses requirements can be measured on the basis of two criterions: the selectivity and the dynamic (represented in the figure respectively on the horizontal and the vertical axis). By selectivity, it is meant the capacity of a tool to target the most pertinent information at a given time. The dynamic, on the other side, is representative of the ability to follow the progress of a piece of code and its execution path during a defined time interval.

The main characteristics of the different data capture tools commonly used are listed hereunder:

Global Dump: per definition the capture of the entire storage is the less selective mode (until several mega bytes of data generated) to investigate an error. However, it can represent the only solution when the control program or the processor becomes inoperative requiring the complete restart of the system.

Minor Error Selective Dump: the data capture is limited to the storage related to the code in error. Two types of data are particularly useful for the problem determination:

System Data: data which constitute the code environment and which contribute to the general understanding of the error in the system: system Traces, registers, stacks . . .

Application Data: functional data defined by the code itself at the occurrence of the error.

The amount of data collected during a Selective Dump can vary from ten to several hundreds of kilobytes depending on the complexity of the problem to solve.

The Unsolicited Dump is requested from inside the processor by the code itself; the Solicited Dump as is activated from an operator console or by any external maintenance system.

Internal Traces: they may be permanent in the code. They allow a selective and dynamic view of the code execution. However, to limit the impact on the system performances, their content is limited to the strict minimum. Internal Traces are managed by the faulty program itself and are usually reported by means of the Error Notification (Minor or Major) or Selective Dump mechanism.

External or solicited Traces: they are activated from an external component. They complete the Internal Traces in that they allow a general investigation, in deferred mode, of the code progress, under the condition, of course, to be able to reproduce the problem.

Minor Error Notification: each piece of code detecting an error, software or hardware, permanent or transient, is responsible for creating and reporting an error record whose function is to identify the situation with the first available data needed to understand what is going on. This record is generally composed of:

the identification of the failing element (software or hardware if any) with some general information such as the time of day, the error type . . .

the error data captured by the program itself. They are specific to the context of the faulty application and are usually mentioned under the generic term of FEDC for First Error Data Capture. Because of performance constraints, the error record is generally limited in size to some hundreds of bytes and a Selective Dump is, most of the time, required to complete the information.

Major Error Notification: the faulty program has no more the control of the operations and the error is detected by an external code endowed with extended privileges. This code reports an error record with the data previously declared by the program before is becomes inoperative. This Major Error Record is similar to this reported in case of Minor Errors with the difference that the error data are captured in place of the faulty program and are for this reason less accurate and selective. In most of cases more than one kilo bytes data are necessary to identify and isolate the problem. The object of present invention concerns the way the data are described before a Major Error occurs and the way they can be selectively captured by the external error code in case of failure.

Major Error Selective Dump: this process is not only used to identify the error or to trigger an automatic alarm or an immediate recovery. It completes the information already collected by the Major Error Notification process and authorizes an extensive investigation of the problem in deferred time from a console or from any problem management system. The principle of the data declaration and activation is similar to that implemented in the Major Error Notification process. The data report method, as for it, is conventional and will not be detailed in the present description.

Figure 2:
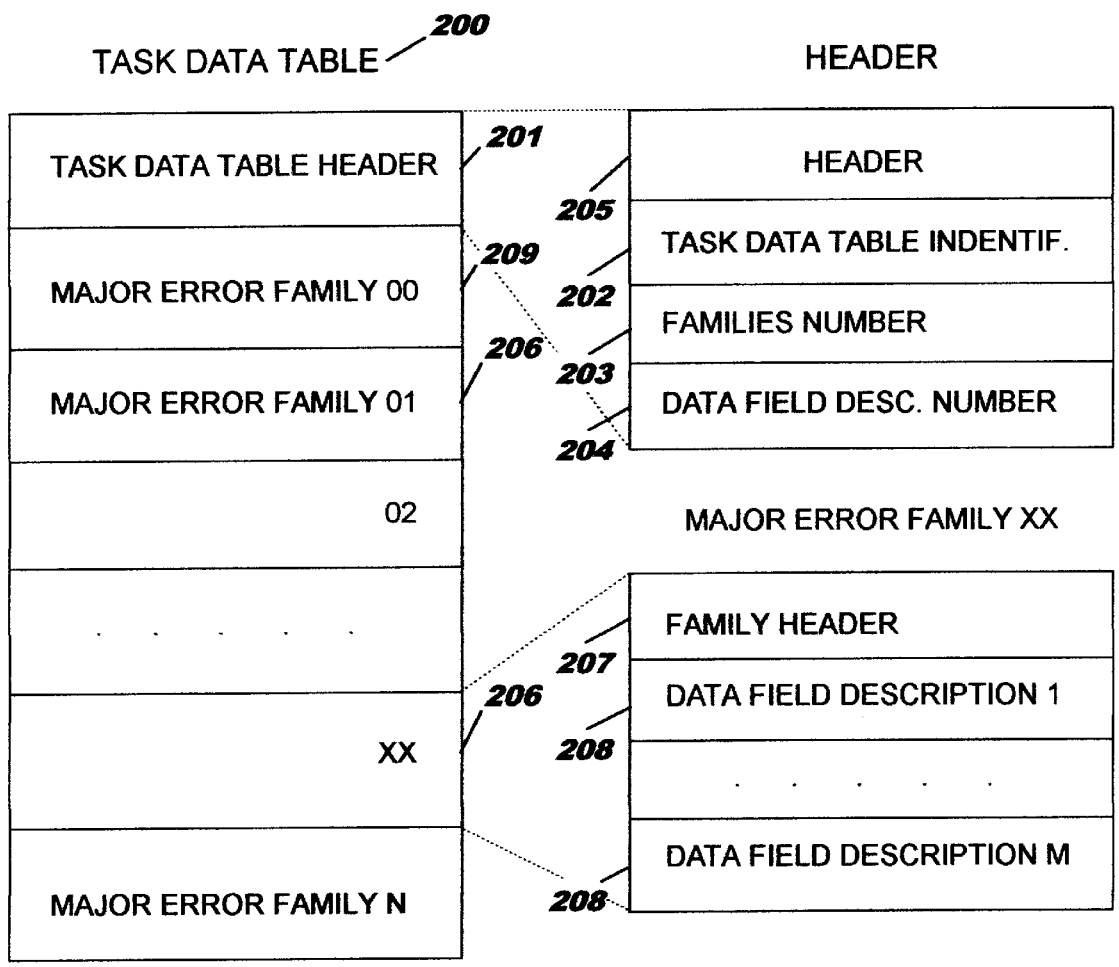
FIG. 2 describes the Task Data Table used by the Major Error Notification process in accordance with the present invention.

FIG. 2 describes the Task Data Table used by the Major Error Notification process in accordance with the present invention.

Generally, to optimize the system resources in function of the specific needs of the applications, the code is divided in logical subsets called Tasks. A Task is an independent entity recognized like that by the Control Program supervising the execution of all applications. Each Task is supposed to represent a particular application and is attributed some specific resources in the system. The Major Error Notification is a process dedicated to any Tasks, allowing an external code, common to all the system and that we can call Error Handler, to build an error record in place of a failing Task with information prepared beforehand by the Task itself. This record is reported by means of a channel common to Minor and Major Errors. To be operational at any time, this method requires, at the key points of the code, an update of parameters describing the data needed to understand the problem if it occurs. Each Task is responsible for its own data in a table called Major Error Task Data Table (MJEN_TDT). The different Task Data Tables (MJEN_TDT) are shared with the Error Handler, are unique for each Task and divided in a certain number of subareas called Major Error Families (MJEN_FAMILY) themselves containing the description of the data fields to capture.

For performance reasons:
all data associated to potential Major Errors are described during an initial period in the Task Data Tables (MJEN_TDT)
the selection by a Task of the pertinent data in the table is simply realized at the key points of the code by the update of an area shared with the Error Handler called Activation Table (MJEN_AT). This table is located in the Task environment to allow a direct access at the activation time.

To limit the storage occupancy:
the Task Data Tables (MJEN_TDT) are defined dynamically according to the exact requirements of the Tasks.
only the description of the data such as address, size, name . . . is entered in the Task Data Tables (MJEN_TDT)
the data stored in temporary memory spaces are declared only for the duration of the allocation and are deleted after that.

To guarantee the integrity of the data descriptions:
the Task Data Table (MJEN_TDT) is located in the Error Handler environment and is addressed indirectly by the Task by means of service procedures.

In a data processing system, two types of memory are generally used by the Tasks, each one requiring a particular mode of data declaration:

the Static Memory is allocated by the system at the creation of each Task. The data in the static memory are declared in the Task Data Table (MJEN_TDT) once for all at the beginning of the code progress.

the Dynamic Memory is required by the Task itself during the execution of the code. The declaration of dynamic data in the Task Data Table is done temporarily, just during the time of the allocation.

The Major Error Notification process is entirely based on the anticipation capacity of the Task with regard of an hypothetic problem. Nobody else better than the Task is able to realize the best choice in term of type and quantity of information to activate for an error which has not yet occurred.

As illustrated on the FIG. 2, the Task Data Table (MJEN_TDT) (200) is logically structured as follows:

(201) the Task Data Table Header which contains all the data required to manage the table according to the storage constraints of the system:
  (202) Task Data Table Identification
  (203) number of Families
  (204) total number of Data Field Descriptions in the table
  (205) internal data such as version, length, last update of the code, . . .
(206) the Families (MJEN_FAMILY) identified with a number from zero to N, each one composed of:
  (207) The Family Header with internal data
  (208) the Data Field Descriptions (MJEN_DFD) with all the attributes needed by the Error Handler to capture the right data What is called Activation is the fact for a Task to update a table shared with the Error Handler with the identification of the right Family (MJEN_FAMILY) to handle in case of error. The direct access by the Task to this table called Major Error Activation Table (MJEN_AT) minimizes the impact of the activation process on the code performance. In return the fact that this table is located in the Task environment does not ensure the total integrity of the information after the error has occurred: the solution presented here is not any more than a compromise between performance and protection and can be modified according to the particular conditions of the implementation. Two types of Families are used
The Common Major Error Family (MJEN_FAMILY_00) or Family zero which is always active and is reserved for the description of the data common to all Major Errors described in the Task. It avoids to consume entries in the Task Data Table (MJEN_TDT) for identical information.
The Specific Major Error Families (MJEN_FAMILY_XX).
  To each Major Error is associated one and only one specific Family only one can be active at the same time and a new activated Family replaces the previous one.
At minimum only one Family is active, the Common Family (MJEN_FAMILY_00) and at maximum two, the Common and the activated Specific Family (MJEN_FAMILY_00 & MJEN_FAMILY_XX).

Figure 3:
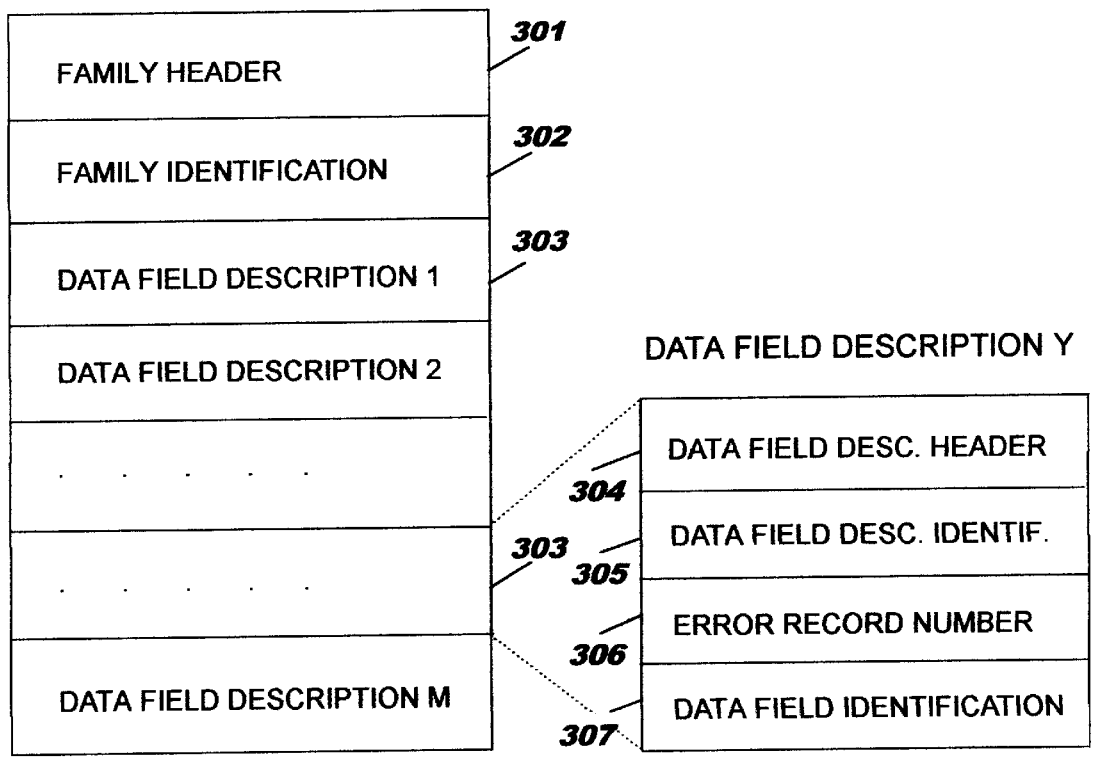
FIG. 3 describes the Data Field Descriptions contained in a Task Data Table in accordance with the present invention.

FIG. 3 describes the Data Field Descriptions contained in the Task Data Table in accordance with the present invention.

Each Family (MJEN_FAMILY) previously defined is organized as follows:
(301) the Family Header with internal data
(302) the Family Identification
(303) Data Field Descriptions, each one composed of:
  (304) the Data Field Description Header with internal data
  (305) the Data Field Description Identification
  (306) the Error Record number under which the data field has to be reported by the Error Handler. To each active Family can be associated until 5 error records: the Task specifies for each entry (see appendix MJEN_ADDITION_P) the number of the record under which the Data Field has to be reported.
  (307) the Data Field Identification: with all the parameters required to retrieve the data from the memory space of the Task:
    Address of the Data Field in the memory space of the Task
    Length of the field
    Name . . .

Figure 4:
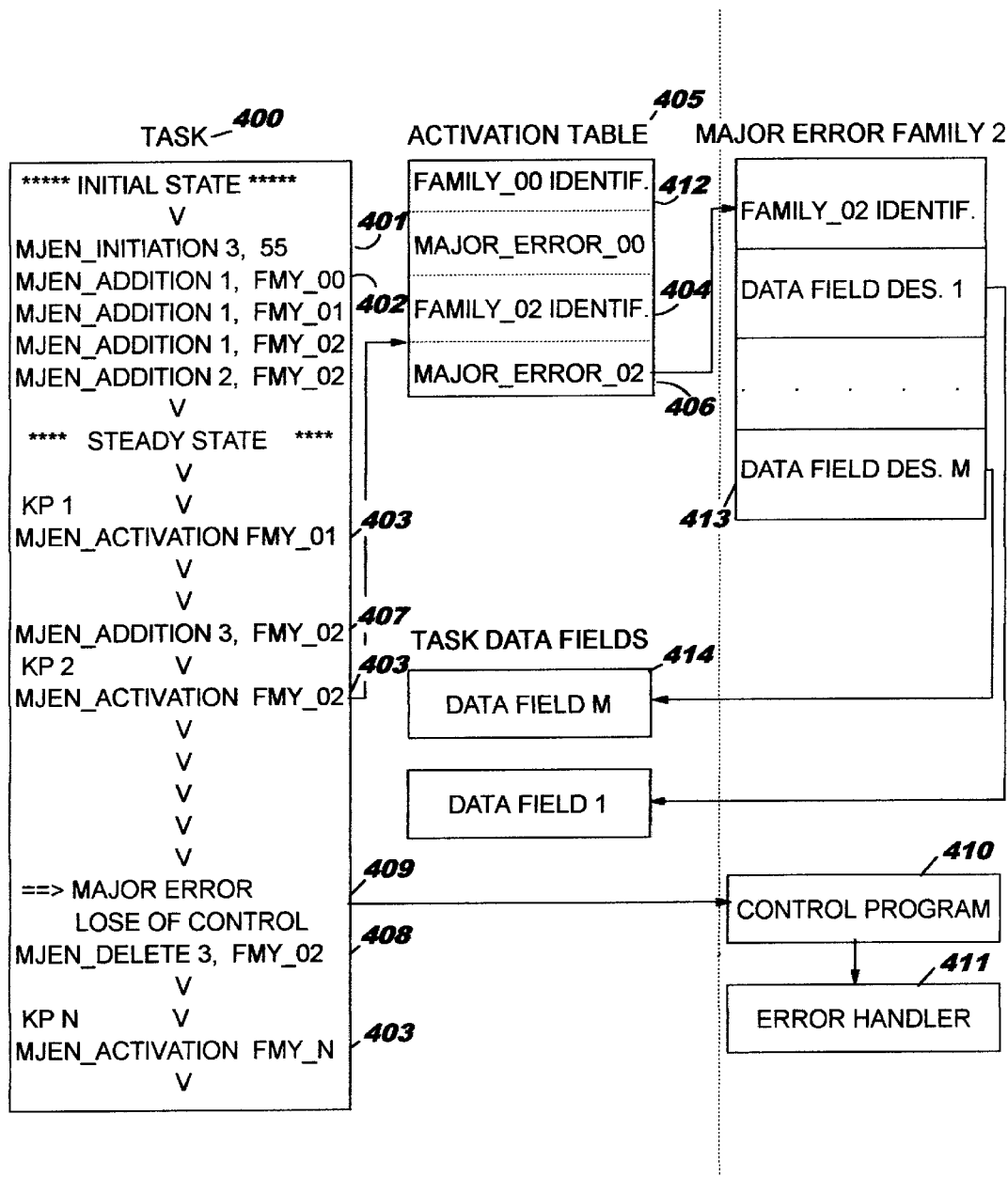
FIG. 4 illustrates the Major Error Notification general mechanism in accordance with the present invention.
Figure 5:
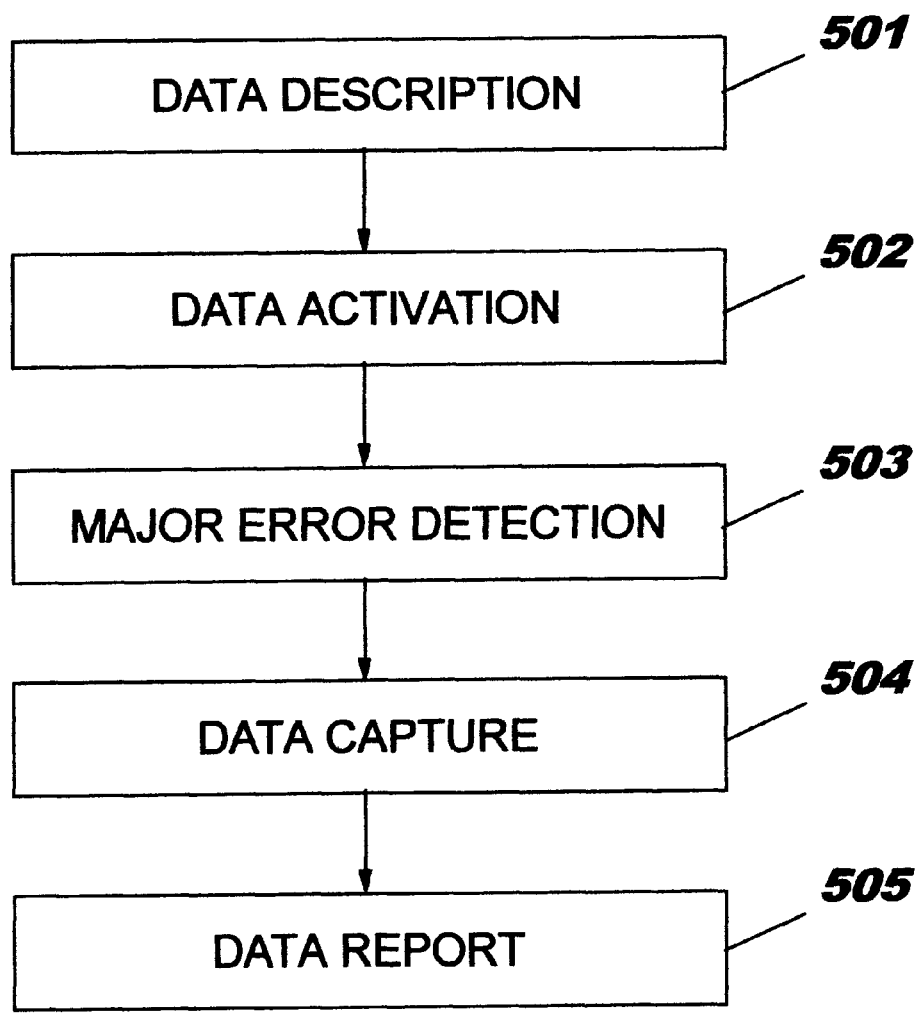
FIG. 5 illustrates the basic operations involved in the data declaration and capture process in accordance with the present invention.

FIG. 4 and FIG. 5 illustrate the general mechanism and the basic operations related to the Major Error Notification process in accordance with the present invention.

Step 501: In a preliminary phase, each Task (400) defines and structures its own Task Data Tables (MJEN_TDT) by means of two service procedures (see appendix for more details)
  (401) MJEN_INITIATION_P: initial elaboration of the Task Data Table
  (402) MJEN_ADDITION_P: entry of a Data Field Description in the previously defined Task Data Table
  The description of the data in the static memory is entered once for all at the beginning of the code execution and for storage reasons, the Common Family (MJEN_FAMILY_00) is defined prior to all others.

Step 502: In a steady state, the Specific Families are activated (403) one after the other at the key points (KP X) of the code. At each key point a Family is selected (404) by the Task in the Activation Table (MJEN_AT) (405) and the situation is described with a specific parameter called Major Error Identificator (406).
  The Task can require during the execution of its code additional memory for a defined period of time. The data stored in this dynamic memory can be declared (407) for the duration of the allocation. After that the entry in the table is deleted by means of the procedure:
  (408) MJEN_DELETE_P: removal of a Data Field Description in the Task Data Table Step 503: When a Major Error occurs (409) the Task loses the control of the operations. The Control Program (410) detects the error and calls the Error Handler (411) to capture and report the appropriate data. The Error Handler is a specific code shared will all the Tasks in the system and endowed with extended privileges such as (not exhaustive list):
  a high priority level to be not interrupted during the data capture
  an extended memory access to read in the Tasks memory space Step 504: The Error Handler identifies the faulty Task and read in the Activation Table (MJEN_AT) the identification of the Common (MJEN_FAMILY_00) (412) and Specific (MJEN_FAMILY_XX) (404) Families activated at last key point. From the descriptions, length, address, name . . . contained in the Data Field Descriptions (MJEN_DFD) (413), the right data (414) are retrieved from the Task memory space.

Step 505: The Error Handler, as soon as the Major Error is detected, creates and reports a Minor Error Record with its own information (First Error Data Capture (FEDC) and with the maximum of System Data like the (not exhaustive list):

current Task characteristics

Information describing the Task environment . . .

In a second stage, it builds a Major Error Record with the Major Error Identificator (406) retrieved from the Activation Table (MJEN_AT) and with the data captured by means of the Family previously selected. This record is reported through the same path as the Minor Errors. But, owing to the fact that the volume of the data to report is more important for a Major Error, until ten kilo bytes in most cases versus some hundreds of bytes, it must be necessary to adapt the size of the Major Error Record to the capacity offered by the traditional report mechanism. For performance reasons, transfer time and storage capacity, the Major Error Record is split in several distinct records not exceeding the size of a Minor Error Record. The way the data are split and the error records built is under the responsibility of each Task: with each Data Field Description entry, the Task specifies the number of record under which the data must be reported (see appendix MJEN_ADDITION_P). That means that for each active Specific Family, the Fault Handler associates from one to five chained error records. All these records are correlated with a specific correlation indicator according to a well known process.

The objectives related to the Selective Dump process can be summarized to the following considerations:

complete the information already collected by means of the Major Error Notification process, for an extensive investigation of the problem in deferred mode. The data captured are not strictly limited to the error data but includes functional data for a better understanding of the problem and its context.

limit the size of the Selective Dump so that the data can be easily transferred, in term of time and storage, to the console or to the maintenance subsystem provide a way of declare easily and with the minimum impact on the code performance the data to dump. This is possible by providing service functions to the applicative code to define dynamically the areas to dump.

Guarantee Dump integrity: work with enough priority level so that the Dump process is not interrupted by application when it has started.

According these constraints, the Selective Dump process is organized in a way which is very similar to the Major Error Notification Process. This means that:

the application code itself describes logically and dynamically the data to capture and to dump.

in a first stage, the application configures a data space called Task Data Table (MJSD_TDT) and declares the data fields to dump in a second stage, in function of the anticipation faculty of the application, the pertinent data sets within the Task Data Table (MJSD_TDT) are selected at the key points of the code the Error Handler initiates and manages the effective capture and report of the declared data.

A Selective Dump is constituted of the following elements:

the System Data: data which constitute the Task environment and which may be useful for the general understanding of the problem: stack, register, system Trace buffer . . . The System Data are directly collected by the Error Handler.

the Application data: data defined directly by the applicative code using the appropriate Dump procedures. They are divided in three types:

the Public Data: data to include in all the Dump triggered in the system. The Public Data represent a general interest for all the applications and are described in a Public Data Table (MJEN_PDT) shared with all the Tasks of the system. This table has the same structure as the Task Data Tables (MJEN_TDT) but is organized around a unique Family permanently activated.

the Common Data: data common to all the Dumps in a same Task. These data are described in the Common Family (MJSD_FAMILY_00) within the Task Data Table associated to the Task. This Common Family is activated each time the Task is operational.

the Specific Data: data collected only with the Dump of the declaring Task. The Specific Data should constitute the most valuable debug information. They are described in the so called Specific Families (MJSD_FAMILY_XX) activated at the key points of the code.

Compared with the Major Error Notification Process, the Selective Dump extends the data capture area to the Public Data by defining a dedicated Task Data Table common to all Tasks. By this means, the Tasks can select data in their own environment and declare them as general interest for all the Dumps in the system.

Functional Data in addition with the Error Data already declared. The Functional Data are related to the Task functionality and to the general execution of the operations independently to any error condition.

The general structure of the Selective Dump and Error Notification Task Data Tables is the same and is illustrated in the FIG. 2 previously described. The content of the Data Field Descriptions differs, as for it, on two points compared with FIG. 3:

the Error Record number parameter is no more used because the data are no more reported to the maintenance subsystem by means of chained records but in a file.

the identification of the Task who has declared the data is mentioned because in most of the cases, the Public Data captured have not been declared by the faulty Task itself but by other Tasks in the same system.

Each Family (MJSD_FAMILY) is organized as follows:

the Family Header with internal data the Family Identification

Figure 7:
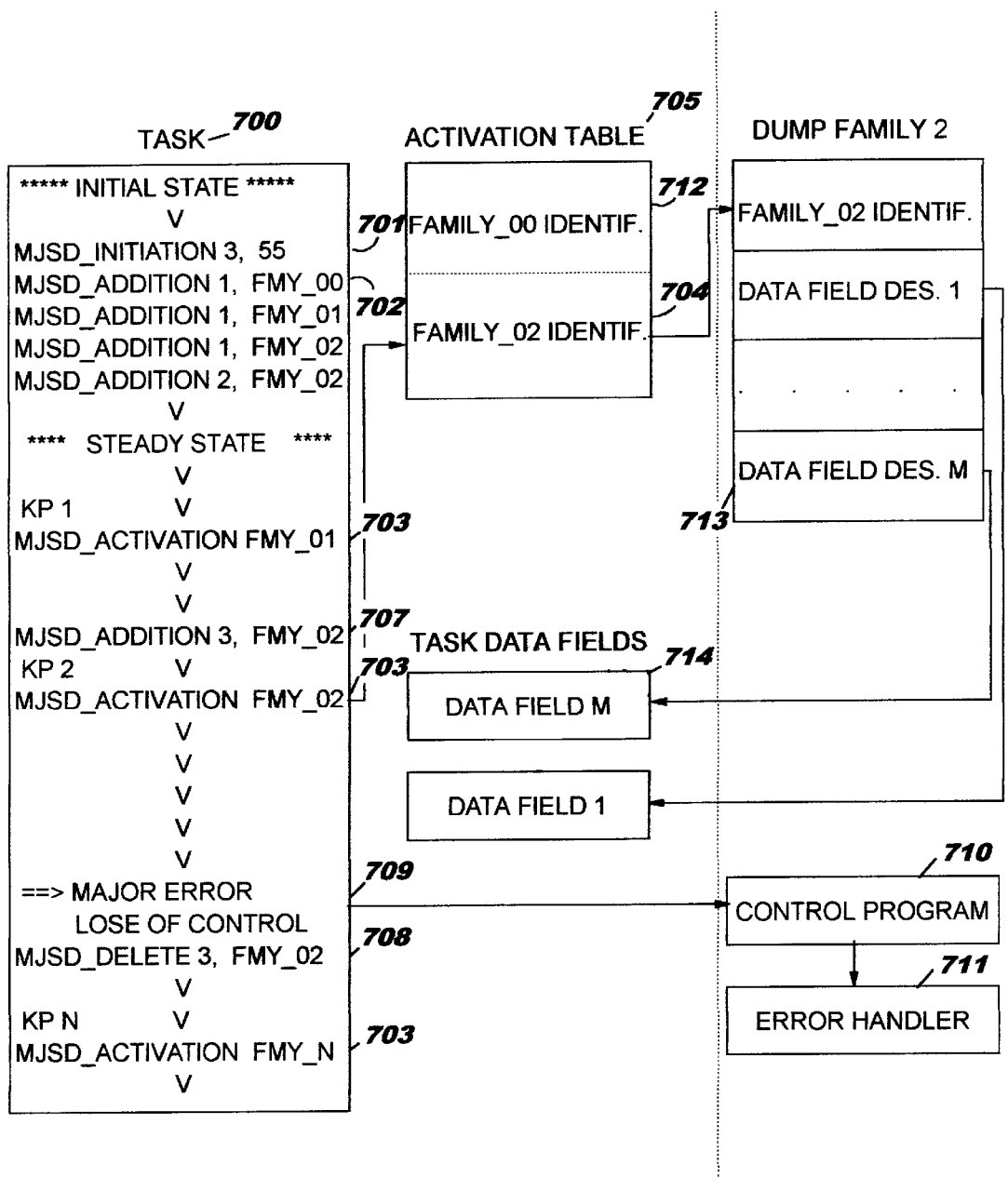
FIG. 7 illustrates the Major Error Selective Dump general mechanism in accordance with the present invention.

Data Field Descriptions, each one composed of:

the declaring Task Identification the Data Field Description Header with internal data the Data Field Description Identification the Data Field Identification FIG. 7 and 5 illustrate the general mechanism and the basis operations related to the Selective Dump process in accordance with the present invention.

Step 501: In an preliminary phase, each Task (700) defines and structures its own Error Notification and Selective Dump Task Data Tables. The Selective Dump Task Data Table (MJSD_TDT) is created by means of two procedures (see appendix for more details):

(701) MJSD_INITIATION_P: initial elaboration of the Task Data Table (MJSD_TDT) in the Error Handler environment. The Public Data Table (MJSD_PDT) is under the direct control of the Error Handler and has not to be defined by the applications.

(702) MJSD_ADDITION_P: addition of a new Data Field Description (MJSD_DFD) in the Task Data Table (MJSD_TDT) previously defined or in the Public Data Table (MJSD_PDT).

The description of the data in the static memory is entered once for all at the beginning of the code execution. For storage reasons the Common Family (MJSD_FAMILY_00) is defined prior to all others.

Step 502: In a steady state, the Specific Families are activated (703) one after the other at the key points (KP X) of the code. The Task selects the proper Dump Family by updating the Family identification parameter (704) in the Selective Dump Activation Table (705) (MJSD_AT). This table is located in the Task environment and its access is shared with the Error Handler (711)

The Task can require during the execution of its code additional memory for a defined period of time. The data stored in this dynamic memory can be declared (707) for the duration of the allocation. After that the entry in the table is deleted by means of the procedure:

(708) MJSD_DELETE_P: removal of a Data Field Description (MJSD_DFD) in the Task Data Table (MJSD_TDT)

Step 503: When a Major Error occurs (709) the Task loses the control of the operations. The Control Program (710) detects the error and calls the Error Handler (711) to manage the capture and report the appropriate data.

Step 504: The Error Handler (711) identifies the faulty Task and read in the Activation Table (MJSD_AT) (705) the identification of the Families, common (MJSD_FAMILY_00)(712) and Specific (MJSD_FAMILY_XX) (704) activated at last key point. From the descriptions contained in the Data Field Descriptions (MJSD_DFD)(713), the right Common and Specific Data (714) are retrieved from the Task memory space. The Public Data are, as for them, retrieved from the descriptions contained in the Public Data Table (MJSD_PDT) whose Family is permanently activated. Most of the Public Data having not been declared by the Task itself, their capture overrun the limited space of the Task. The System Data are not described in the Task Data Tables (MJSD_TDT): for that reason their selection and capture are under the entire responsibility of the Error Handler. All the data retrieved are transferred to a dedicated area in the Error Handler environment to release as soon as possible the applications resources frozen by the Control Program during the Dump process.

Step 505: The Error Handler, as soon as the Major error is detected, creates and reports a Minor and Major Error according to the Error Notification process previously described.

In a second stage, all the data retrieved are formatted in a Dump file and reported according a classic method which is not the object of the present invention. In our case the Minor Error record previously reported notifies a maintenance subsystem of the presence of a Selective Dump File ready to report. The error Notification records and the Selective Dump are correlated by the means of a specific indicator to make easier the problem determination at the maintenance subsystem level.

Figure 6:
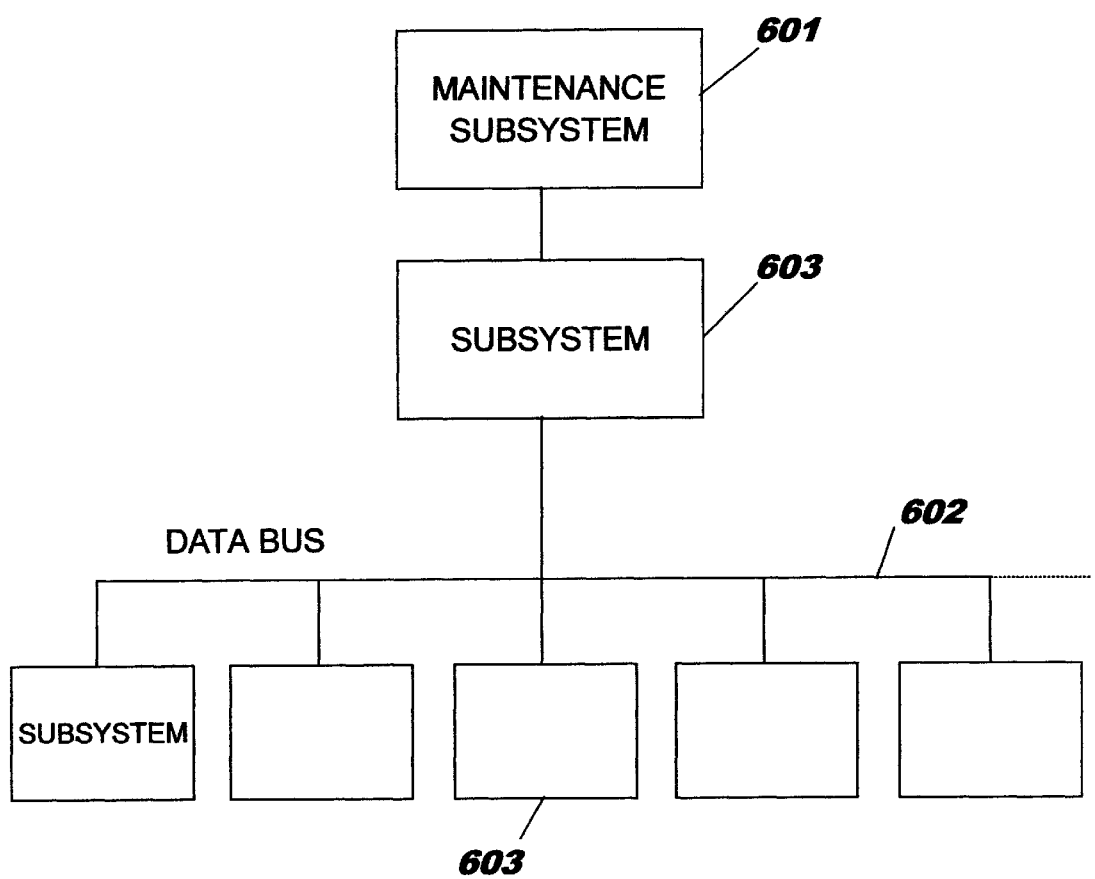
FIG. 6 describes a data processing system particularly adapted to an implementation of the present invention.

Major Error Notification and Selective Dump are particularly adapted to multitasking and multiprocessing environments. The system illustrated on FIG. 6 and described hereafter is typical of the context inside which the present invention can be implemented. This data processing system is composed of:

an external operator console and maintenance system (601) for configuration, change management and problem analysis the subsystems (603), each one characterized with a 32 bits microprocessor INTEL 80486 a real time operating mode a multitasking operating system (more than 100 Tasks in parallel)

a paged virtual memory a dynamic allocation of the memory a 12 megabytes memory a data bus (602) connecting up to more than 10 subsystems The whole system represents approximately half a million lines of code.

The program exceptions are specific to the processor 80486 and are detailed in the INTEL Programmer's Reference Manual. They handle Major Error conditions detected by the processor 80486 itself in the course of executing instructions.

All the data captured in the subsystems are reported to the console for analysis.

The following values are characteristic of the present environment:

Minor Error Notification:

Maximum data size of the error record: 2 kilobytes per record

Major Error Notification:

Maximum number of Families for a Task: 64

Maximum number of Data Field Descriptions for a Task: 145

Maximum data size: 10 kilobytes in 5 error records of 2 kilobytes

Selective Dump:

Objective dump size allowed to the applications: less than 300 kilobytes (Common & Specific Data)

Maximum number of dump Families for a Task: 16

Maximum number of Data Field Description for a Family: 1024

Observations:

The Major Error process is suitable to all operating systems.

The partition of the code in Tasks such as defined previously for the Major Error Notification and Selective Dump is particularly adapted to the multitasking operating mode. This segmentation in independent applications converges with the organization of multitasking processors such as the 80486.

The impact of the Major Error process on on the architecture of an application is very limited and allows an easy adaptation of the reuse or multi-source codes.

The development of the code necessary for the present invention requires preferably the use of highly structured and strongly typed languages like ADA, C/C++ . . . well suited for the creation of complex, massive and software intensive systems.

APPENDIX

The specific procedures related to the Major Error Notification and Selective Dump process are detailed in the following paragraphs:

Major Error Notification

MJEN_INITIATION_P

FUNCTION:

This procedure is called by the Task to configure the logical space used to declare the data to collect in case of Major Error. This logical space, called Major Error Task Data Table (MJEN_TDT) is:

unique for each Task located in the Error Handler environment divided in a certain number of subareas called Major Error Families (MJEN_FAMILY) themselves containing the description of the data fields to capture.

To adapt the storage resources to the particular needs of each task, the number of Families (MJEN_FAMILY) and of Data Field Description (MJEN_DFD) must be declared by the applicative code before to be operational.

INPUT PARAMETERS:

The code calls the MJEN_INITIATION_P procedure with a list of input parameters:

MJEN_TDT: identification of Major Error Task Data Table associated with the subscribing Task MJEN_FAMILIES_NUMBER: number of Major Error Families (MJEN_FAMILY) subscribed by the Task MJEN_DATA_FIELD_DESCRIPTIONS_NUMBER: Total number of Data Field Descriptions (MJEN_DFD) subscribed by the Task

SYNCHRONOUS OUTPUT PARAMETERS:

MJEN_FAMILIES_NUMBER_ACK: number of Major Error Families (MJEN_FAMILY) really attributed to the task. The identification of these the Family is defined as a range of contiguous values starting from zero.

MJEN_DFD_NUMBER_ACK: number of Data Field Desriptions (MJEN_DFD) really attributed to the task. This number depends of the storage available at the required time.

MJEN_RETURN_CODE: return code OK or KO according to the result of the initiation procedure.

ASYNCHRONOUS OUTPUT PARAMETERS:

None

MJEN_ADDITION_P

FUNCTION:

This procedure is called after configuration of the Task Data Table (MJEN_TDT) to store in the Families (MJEN_FAMILY) the description of the data the Task would like to capture in case of Major Error.

INPUT PARAMETERS:

The code calls the MJEN_ADDITION_P procedure with a list of input parameters

MJEN_TDT: identification of Major Error Task Data Table associated with the subscribing Task MJEN_ERROR_RECORD_NUMBER: number of the Minor Error Record that will contain the declared data field.

MJEN_FAMILY: Major Error Family (MJEN_FAMILY) selected to receive the description of the data field defined hereunder MJEN_DFD_DESCRIPTION: Data Field Description to enter in the Major Error Family (MJEN_FAMILY) previously defined Address Name Size

. . .

SYNCHRONOUS OUTPUT PARAMETERS:

MJEN_DFD_IDENTIFICATION: identification of the new added Data Field Description (MJEN_DFD) returned by the procedure MJEN_RETURN_CODE: return code OK or KO according to the result of the operation.

ASYNCHRONOUS OUTPUT PARAMETERS:

None

MJEN_DELETE_P

FUNCTION:

This procedure is called to remove a Data Field from a Family.

INPUT PARAMETERS:

The code calls the MJEN_DELETE_P procedure with a list of input parameters:

MJEN_TDT: identification of the Task Data Table associated to the Task requesting the removal of the data field.

MJEN_FAMILY: Error Notification Family from which the Data Field has to be removed. A specific value indicates the request of the complete clearance of all Families.

MJEN_DFD_IDENTIFICATION: Identification of the Data Field Description to remove from the Family. A specific value allows the delete of all entries of a same Family.

SYNCHRONOUS OUTPUT PARAMETERS:

MJEN_RETURN_CODE: return code OK or KO according to the result of the operation

ASYNCHRONOUS OUTPUT PARAMETERS:

None

Major Error Selective Dump

MJSD_INITIATION_P

FUNCTION:

This procedure is called by the Task to configure the logical space used to declare the data to collect in case of Major Error. This logical space, called Major Error Task Data Table (MJSD_TDT) is:

unique for each Task located in the Error Handler environment divided in a certain number of subareas called Major Error Families (MJSD_FAMILY) themselves containing the description of the data fields to capture.

To adapt the storage resources to the particular needs of each task, the number of Families (MJSD_FAMILY) and of Data Field Description (MJSD_DFD) must be declared by the applicative code before to be operational.

INPUT PARAMETERS:

The code calls the MJSD_INITIATION_P procedure with a list of input parameters:

MJSD_TDT: identification of Major Error Task Data Table associated with the subscribing Task MJSD_FAMILIES_NUMBER: number of Major Error Families (MJSD_FAMILY) subscribed by the Task MJSD_DFD_NUMBER: Total number of Data Field Descriptions (MJSD_DFD) subscribed by the Task

SYNCHRONOUS OUTPUT PARAMETERS:

MJSD_FAMILIES_NUMBER_ACK: number of Major Error Families (MJSD_FAMILY) really attributed to the task. The identification of these the Family is defined as a range of contiguous values starting from zero.

MJSD_DFD_NUMBER_ACK: number of Data Field Descriptions (MJSD_DFD) really attributed to the task. This number depends of the storage available at the required time.

MJSD_RETURN_CODE: return code OK or KO according to the result of the initiation procedure.

ASYNCHRONOUS OUTPUT PARAMETERS:

None

MJSD_ADDITION_P

FUNCTION:

This procedure is called to add a Data Field to a Family.

INPUT PARAMETERS:

The code calls the MJSD_ADDITION_P procedure with a list of input parameters:

MSDN_TDT: identification of the Task Data Table associated to the Task requesting the service.

MJSD_TYPE: a declared Data Field can be either Common, Specific or Public. Public means that the Data Field is to be included in all the performed dumps. Its description is entered in the Public Data Table managed by the Error Handler. Specific and Common Data Fields are, as for them, entered in the Task Data Table (MJSD_TDT) of the declaring Task.

MJSD_FAMILY: dump Family to which the Data Field is assigned. One Family is dumped at the same time.

MJSD_DFD: Data Field Description (MJSD_DFD) assigned to the family previously declared:
Address of the Data Field in memory
Size of the field

SYNCHRONOUS OUTPUT PARAMETERS:

MJSD_DFD_IDENTIFICATION: identification of the new added Data Field Description (MJSD_DFD) returned by the procedure MJSD_AVAILABLE_SIZE: available remaining size for the dump Family compared with the maximum length authorized.

MJSD_RETURN_CODE: return code OK or KO according to the result of the operation

ASYNCHRONOUS OUTPUT PARAMETERS:

None

MJSD_DELETE_P

FUNCTION:

This procedure is called to remove a Data Field from a Family.

INPUT PARAMETERS:

The code calls the MJSD_DELETE_P procedure with a list of input parameters:

MJSD_TDT: identification of the Task Data Table associated to the Task requesting the removal of the data field.

MJSD_FAMILY: dump Family from which the Data Field has to be removed. A specific value indicates the request of the complete clearance of all Families.

MJSD_DFD_IDENTIFICATION: Identification of the Data Field Description to remove from the Family. A specific value allows the delete of all entries of a same Family

SYNCHRONOUS OUTPUT PARAMETERS:

MJSD_RETURN_CODE: return code OK or KO according to the result of the operation

ASYNCHRONOUS OUTPUT PARAMETERS:

none

What is claimed is:

1. A selective method for capturing data in software exception conditions (Major Errors) during the operation of a data processing system, said system operating with at least one task, each said task being endowed with a dedicated memory space and being executed on instruction of a control program, characterized in that it involves the steps of:

defining dynamically for each task a data table (Task Data Table 200), said data table being divided into a certain number of subsets (Families 206)

describing in each subset (Family 206) once at the beginning of the task execution, the data fields, permanently defined in the memory of the task, which are relevant for the Major Errors anticipated by the task, describing in each subset (Family 206), in the course of the execution of the task, the data fields, dynamically defined by means of a temporary memory allocation, which are relevant for the exception condition (Major Error) anticipated by the task, selecting (403, 703) at each potential exception condition in the code the appropriate subset (Family 206) in an activation table (405 or 705) unique for each task, detecting, when it occurs, an exception condition (409, 709) and identifying the faulty task, transferring the control of the operations to an error handler code (Error Handler 411 or 711), said code being endowed with a priority level higher than the level of the tasks and being authorized to access the tasks memory, retrieving by the error handler code (Error Handler 411 or 711) the pertinent data fields from the descriptions (208) contained in the last subset (Family 206) selected in the activation table (405 or 705) associated with the faulty task.

2. The selective data capture method according to claim 1 characterized in that the descriptions in the the data table (Task Data Table 200) of the data fields dynamically defined are deleted after release of the temporary memory allocated to the task.

3. The selective data capture method according to anyone of claims 1 and 2 characterized in that the data fields (414) described in data tables (Task Data Table 200), one data table for each task, contain all the information to identify potential program exceptions and the corresponding failing elements, said data fields (414) are the object, when a program exception occurs, of an error notification to a maintenance subsystem.

4. The selective data capture method according to claim 3 characterized in that the data fields (714) described in data tables, one data table for each task, contain all the information required to understand potential program exceptions within the general context of the operations, said data fields (714) are the object, when a Major Error occurs, of a file transfer to a maintenance subsystem.

5. The selective data capture method according to claim 4 characterized in that each data table (Task Data Table 200) contains in one side a common subset (Family 209), permanently selected, with data fields descriptions common to all potential program exceptions identified in the task and on the other side specific subsets (Families 206) with data fields specific to each potential exception condition, only one specific subset (Family 206) being selected at the same time.

6. The selective data capture method according to claim 5 characterized in that the data fields of common interest for all the tasks and all the program exceptions in the system are described in a public table shared by all the tasks, said table containing a unique subset (Family 209) permanently selected.

7. The selective data capture method according to claim 6 characterized in that: the data tables (Task Data Tables 200) and the public table are located in the memory space of the error handler code (411 & 711), and each activation table (405 & 705) is in the memory space of its associated task.

8. The selective data capture method according to claim 7 characterized in that: the data tables (Task Data Tables 200) definition, the entry and delete of the data fields descriptions (208) are realized synchronously by the tasks by means of service procedures common to all the tasks.

9. In a data processing system including operating system, an application program having at least one task running thereunder and an Independent Error Handling program running under the operating system, a method for selectively capturing data under software exception (Major Error) conditions including the following steps:

in said application program:

defining for each task a data table (Task Data Table 200) located in the Independent Error Handling program domain, said Table being divided into a plurality of subsets (Families 206) each of which includes a description of data fields in the task memory which are relevant to exception condition (Major Error) anticipated by the task;

at each potential exception condition in the task, selecting (403, 407) a predetermined and appropriate subset (Family 206) in an activation table (405 or 705) shared with the Independent Error Handling program;

said operating system upon detection of an exception condition (409, 709) in a task, transferring control to the said Independent Error Handling program along with authority to access the task memory and at a priority level greater than the task priority level; and, said Independent Error Handling program retrieving data fields from the descriptions (208) contained in the last subset (Family 206) selected in the activation table associated with the failed task.

10. The selective data capture method set forth in claim 9 in which the data fields described in the task data table, include information for identifying potential program exceptions and corresponding failing elements, said descriptions may be used as the object of an error notification to a maintenance subsystem.

11. The selective data capture method set forth in claim 9 in which the data fields described in the task data table, include information required to understand potential program exceptions within the general context of the operations, said data fields may be used as the object of a file transfer to a maintenance system when a Major Error occurs.

* * * * *